April 10, 1945.　　　R. R. CURTIS　　　2,373,463
PUMP SEAL
Filed May 22, 1943　　　2 Sheets-Sheet 1
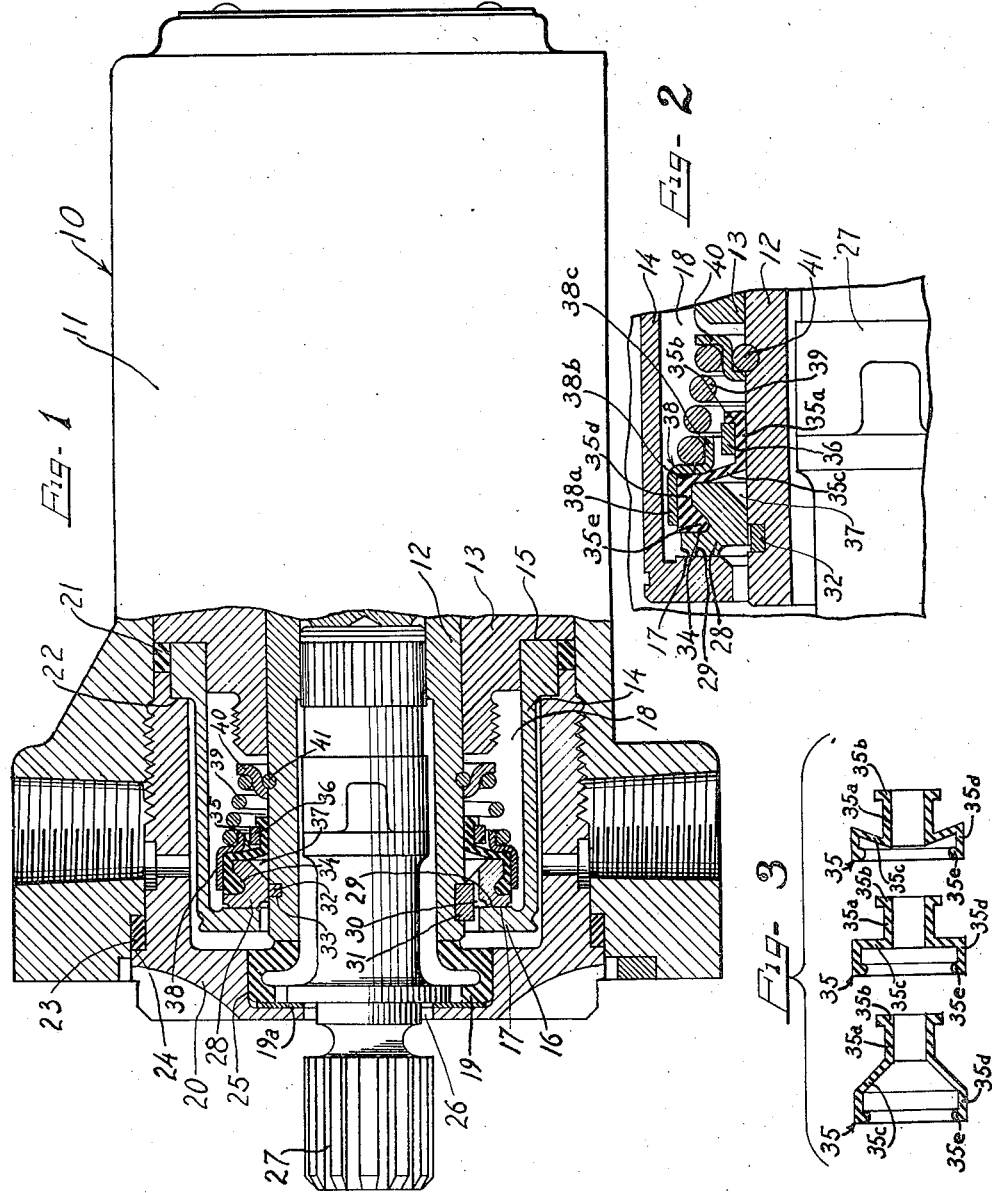
Inventor
RUSSELL R. CURTIS
by Charles W Hills Attys.

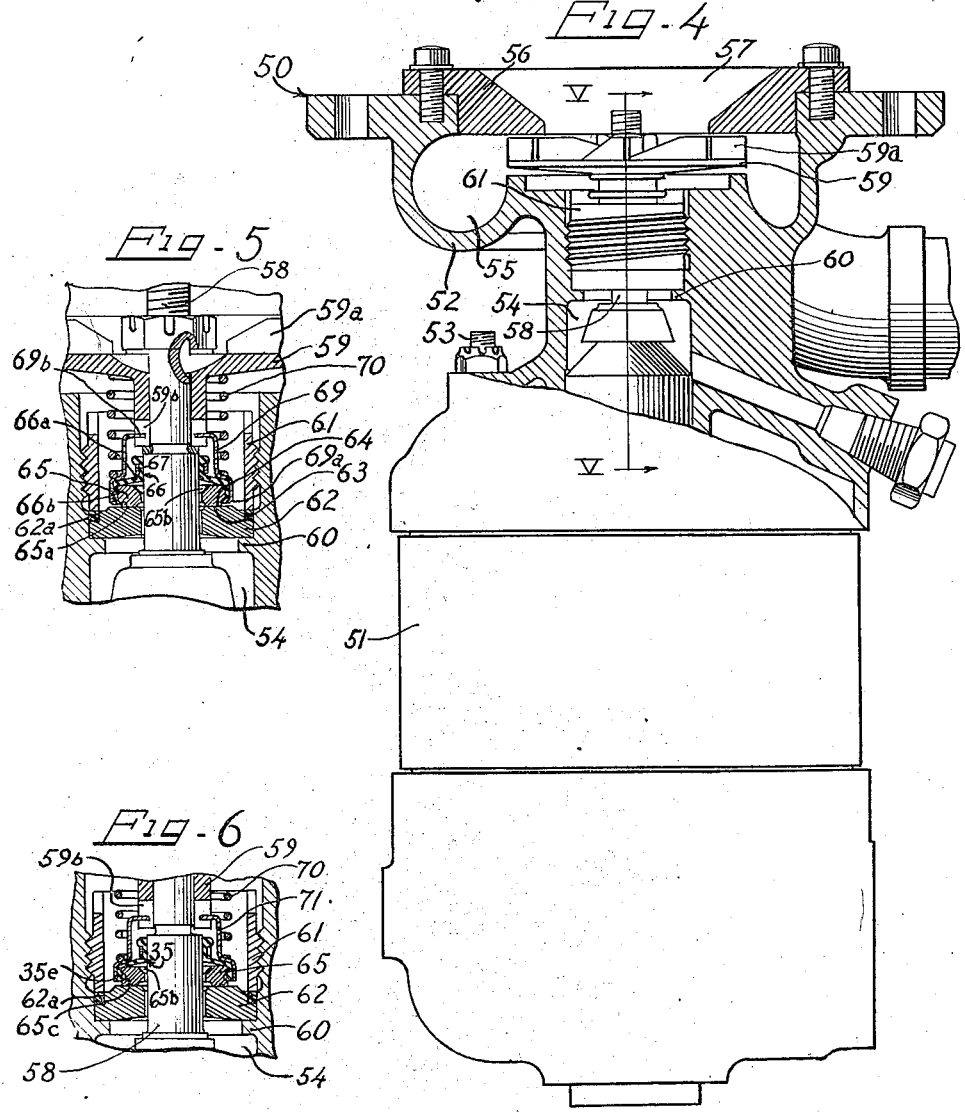

Patented Apr. 10, 1945

2,373,463

UNITED STATES PATENT OFFICE

2,373,463
PUMP SEAL

Russell R. Curtis, Dayton, Ohio, assignor to Curtis Pump Company, Dayton, Ohio, a corporation of Ohio Application May 22, 1943, Serial No. 488,021

11 Claims. (Cl. 286—11)

This invention relates to seals for relatively rotating members and particularly to seals having flexible diaphragm sleeves connecting a seal ring in sealing relation with one of the members while allowing relative movement between the seal ring and this member.

In accordance with this invention, a rotating member drives a seal ring in sliding face contact with a cooperating seal ring. The driven seal ring is connected in sealing relation to the rotating member through a sleeve having a reduced diameter neck or collar portion snugly engaging the rotating member in sealing relation therewith, an enlarged mouth or collar portion snugly embracing the driven seal ring in sealing relation therewith, and a flexible flange or shoulder connecting said portions and acting as a diaphragm. The entire sleeve is in one piece and preferably composed of rubber or similar plastic material. A metal cup preferably surrounds the enlarged mouth portion of the sleeve and a spring acts on this cup to urge the driven seal ring against the cooperating stationary seal ring. The sleeve can be flexed at its shoulder or flange portion to permit relative movement between the driven seal ring and the rotating member.

In a preferred embodiment of the invention the enlarged mouth of the sleeve has an internal bead adapted to be seated in a groove provided in the driven seal ring thereby preventing axial separation of the seal ring and sleeve.

In another form of the invention the cup can be spun over a shoulder on the driven seal ring to clamp the mouth of the sleeve against this shoulder and thereby prevent axial displacement of the sleeve relative to the seal ring.

In the form of the invention utilizing the internal bead in the sleeve the cup need not be deformed over the seal ring and therefore can be readily mounted and removed.

A feature of the invention includes the beveling or chamfering of a portion of the driven seal ring adjacent the shoulder or flange of the sleeve so that this shoulder or flange can have a wider range of flexing movement and so that diaphragm action of the sleeve will not be destroyed even though the sleeve sticks to the seal ring.

It is, then, an object of this invention to provide a simplified seal construction for relatively rotating members which includes a flexible diaphragm type sleeve connecting one of the members with a seal part while allowing movement between this member and the seal part.

A further object of the invention is to provide a diaphragm type seal construction for relatively rotating members wherein a flexible rubber sleeve permits movement of one of the members without moving the seal carried by this member.

A still further object is to provide a seal construction of the relatively rotating seal ring type wherein the rotating seal ring is sealingly connected to a rotating member through a rubber sleeve clamped on the member and embracing the seal ring.

A still further object of the invention is to provide a readily assembled and disassembled seal construction including a seal ring, a stepped rubber sleeve embracing said ring, and a cup member surrounding said sleeve to hold the same on the seal ring.

A specific object of the invention is to provide a sleeve for seals having an inturned bead or lip for seating in a groove of a seal part to prevent axial displacement of the seal part and sleeve.

A further object of the invention is to provide a shaft seal including a rubber sleeve clamped on the shaft, a rotating seal ring surrounding the shaft and receiving a portion of the rubber sleeve therearound, and a cup member embracing the portion of the sleeve surrounding the seal ring.

Other and further objects of the invention will be apparent to those skilled in the art from the following detailed description of the annexed sheets of drawings which, by way of preferred examples only, illustrate several embodiments of the invention.

On the drawing:

Figure 1 is a side elevational view, with parts broken away and shown in vertical cross section of a vane type fuel pump having a seal construction according to this invention.

Figure 2 is an enlarged fragmentary vertical cross-sectional view, with parts in elevation, of the seal construction and associated mechanism of the pump shown in Figure 1.

Figure 3 is a vertical cross-sectional view of a rubber sleeve used in the seal construction of this invention illustrating various positions that can be assumed by the sleeve.

Figure 4 is a side elevational view, with parts broken away and shown in vertical cross section of an electric motor driven centrifugal type booster pump having a seal according to this invention.

Figure 5 is a fragmentary vertical cross-sectional view, with parts in elevation, taken substantially along the line V—V of Figure 4.

Figure 6 is a fragmentary view similar to Figure 5 illustrating the seal construction embodying the rubber sleeve shown in Figure 3, substituted for the sleeve shown in Figure 5.

As shown on the drawing:

In Figure 1 the reference numeral 10 designates generally a fuel pump of the rotary vane type including a casing 11 housing the rotor of the pump (not shown). A hollow shaft or hub portion 12 extends from the rotor in the casing 11 and is rotatably supported in a bearing 13 mounted in the casing. A metal cup member 14 is mounted in the casing and has the open end 14 thereof bottomed on the bearing 13. The cup member 15 has an apertured end 16 surrounding the hollow shaft or hub 12 and providing a flat sealing face 17. A space 18 is thus provided between the cup 14 and shaft or hub 12.

A rubber oil seal ring 19 abuts the end of the hub or shaft 12 as shown and is covered with a thin thrust washer 19a.

An end cap 20 is threaded to the casing, surrounds the cup 14 and abuts the washer 19a. A resilient gasket 21 is positioned between the end cap and the bearing 13. The end cap is provided with a shoulder 22 for bottoming on the cup 14. A second resilient gasket 23 is positioned between the casing and an out-turned flange 24 on the end cap.

The end cap 20 is recessed as at 25 to receive the rubber ring 19 and has an aperture 26 therethrough to receive a driver 27 which projects into the hollow shaft 12 to drive the rotor. The driver can be splined to an engine part.

Since fuel may leak into the space 18 it is necessary to seal this space from the atmosphere, and for this purpose a seal ring 28 is provided on the shaft 12. This ring 28 has a face 29 for sliding face engagement with the face 17 of the cup 14. The ring 28 is internally slotted as at 30 to receive the key head 31 of a snap ring 32 which is seated in a groove 33 formed around the shaft 12. The ring 28 is thus driven by the shaft in slidable keyed connection therewith.

The ring 28 has a groove 34 around the periphery thereof. A rubber sleeve 35, best shown in Figure 3, has a reduced diameter collar or neck portion 35a with an outturned flange 35b at one end thereof and an outturned shoulder or flange 35c at the other end thereof. A large collar portion or mouth portion 35d extends axially forward from the outer end of the shoulder 35c and has an inturned head or lip 35e at the free end thereof.

As shown in Figure 3 the shoulder of the flange 35c is adapted to be flexed so that the neck or collar portions 35a and 35d can be moved toward or away from each other.

The collar portion 35a as best shown in Figure 2 snugly embraces the hub or shaft 12 and is held in sealed engagement therewith by means of a metal snap ring or band 36 surrounding the collar between the flanges 35b and 35c of the sleeve. These flanges are effective to prevent the ring 36 from slipping off of the collar 35a.

The enlarged collar or mouth portion 35d embraces the seal ring 28 and the lip or bead 35e thereof is snugly seated in the groove 34 of the seal ring.

The seal ring 28 is inwardly beveled or chamfered as at 37 so that at least a portion of the shoulder or flange 35c is normally spaced from the seal ring and can act as a diaphragm even though the sleeve should have portions thereof stuck to the seal ring 28.

The bead or lip 35e is effective to prevent axial removal of the sleeve from the seal ring. The rubber sleeve is sufficiently deformable so that it can be slipped over the seal ring to position its lip or bead in the groove of this ring.

A metal cup member 38 has a cylindrical skirt 38a snugly surrounding the portion 35d of the rubber sleeve, a shoulder 38b covering a portion of the sleeve flange 35c, and a neck portion 38c in spaced relation from the collar portion 35a of the sleeve. The skirt 38a of this metal cup member will prevent radial removal of the sleeve from the seal ring 28 and holds the sleeve in sealed relation with the seal ring.

A conical coil spring 39 has the large end coil thereof surrounding the collar 38c of the cup 38 and bottomed on the shoulder 38b. The small end coil of the spring 39 surrounds and is bottomed on a washer or retainer 40 mounted on the shaft 12 and held in spaced relation from the bearing 13 by means of a snap ring 41 seated in a groove provided in the shaft.

The spring 39 thus acts on the cup 38 to urge the rotating seal ring 28 into sliding face engagement with the stationary seal ring surface provided by the face 17 of the cup 14.

The seal ring 28 of course is driven with the shaft 12 and the sleeve 35 maintains the shaft 12 and seal ring 28 in sealing relation to prevent leakage from the space 18 through the seal ring 28.

As illustrated in Figure 3, the collar portions 35a and 35d of the sleeve 35 can move relative to each other through flexing of the shoulder 35b and therefore the shaft 12 can move axially or tilt without unseating the seal ring 28 from face engagement with the sealing face 17. The shoulder 35c acts as a diaphragm and, if the space 18 is subjected to pressure, the sleeve will therefore be effective in aiding the spring 39 to hold the seal ring 28 against its cooperating sealing face.

The flexible shoulder 35c of the sleeve 35 also permits the full load of the spring 39 to be transmitted to the seal ring 28 independently of any physical changes which take place in the diaphragm such as may occur in variation of operating temperatures, in absorption of fuel and the like. The seal of this construction is very efficient even at the low temperatures such as exist in high altitudes as when the fuel pump 10 is used in an airfraft. The spacing of at least a portion of the shoulder 35c from the ring 28 by providing the bevel or recessed face 37 in the ring will insure maintenance of flexing conditions for this shoulder even though the sleeve should freeze to or otherwise stick onto the ring. The bevel or recess 37 also permits increased relative axial movement of the collar portions 35a and 35d as indicated in Figure 3, since the collar can extend into the recess 37.

The seal construction is readily assembled and disassembled since the cup 38 need only have a snug sliding fit over the collar portion 35d of the sleeve. It can thus be readily removed and assembled. The sleeve being preferably composed of rubber or other resilient material can be stretched over the seal ring 28 and over the shaft 12.

In the embodiment of Figure 4 the reference numeral 50 designates generally a centrifugal type fuel booster pump composed of a motor casing 51 housing an electric motor or other prime mover, and a pump casing 52. The pump casing 52 is secured to the motor casing 51 as by means of bolts or studs 53. The pump casing 52 defines a shaft well 54, a pumping chamber 55 and an aperture in which a throat ring 56 is seated providing an inlet 57 to the pump.

A shaft 58 from the motor in the casing 51 extends through the shaft well 54 and receives in keyed relation thereon a disk impeller 59 having upstanding pumping vanes 59a thereon for propelling fuel from the inlet 57 to the pumping chamber 55.

The shaft well 54 has an inturned flange 60 formed therein through which the motor shaft 58 freely extends. A metal sleeve 61 is threaded into the shaft well beneath the impeller 59.

As best shown in Figure 5 a stationary seal ring 62 is held on the inturned flange or shoulder 60 of the well 54 by the sleeve 61 which thrusts against a bearing gasket and washer 62a seated in a groove around the ring 62. The motor shaft 58 projects freely through this seal ring. The seal ring 62 has a flat top sealing face 63 cooperating with a bottom sealing face 64 of a rotating seal ring 65. This rotating seal ring 65 also loosely embraces the shaft 58 and a rubber sleeve 66 connects the shaft and seal ring in sealing relation. This rubber sleeve 66 has a reduced collar portion identical to the collar portion 35a described in Figures 1 to 3 embracing the shaft 58 and held thereon by means of a snap ring 67. A flexible shoulder portion 66a projects outwardly from the collar portion on the shaft and an enlarged skirt portion 66b is provided on the end of the shoulder 66a. This skirt 66b embraces the rotating seal ring 65. The rotating seal ring 65 has a bevelled face 65a providing a shoulder adjacent the sealing face 64 thereof. A metal cup member 69 surrounds the skirt portion 66b of the sleeve and has the end thereof spun inwardly as at 69a to clamp the end of the skirt portion 66b on the seal ring face 65a. The top face of the seal ring is beveled around the aperture therein as at 65b so that the rubber sleeve will always function as explained in connection with Figures 1 to 3.

The cup 69 has tangs 69b thereon seated in recesses 59b of the hub portion of the impeller 59 for driving the cup 69 with the impeller and shaft 58.

A coiled spring 70 is held under compression between the impeller 59 and a shoulder on the cup 69 for urging the seal ring 65 against the seal ring 62.

The shoulder or flange 66a of the sleeve 66 can flex toward and away from the ring 65 thereby permitting movement of the shaft 58 without unseating the ring 65 from cooperating sealing relation with the ring 62. In this embodiment, however, the cup 69 is not freely removable from the sleeve 66 inasmuch as its end 69a has been deformed. The sleeve 66, however, need not be provided with a lip in this installation.

In the embodiment of Figure 6 the seal for the booster pump 50 includes the same sleeve 35 described in connection with Figures 1 to 3. In this embodiment the rotating seal ring 65 has a groove 65c receiving the bead or lip 35e of the sleeve. A cup member 71 drivingly connecting the impeller 59 and the sleeve rotating seal ring 65 is not deformed over the end of the sleeve as in Figure 5 since the lip 35e will hold the sleeve against axial displacement off of the seal ring. As shown in Figure 6, the skirt or mouth end of the cup 71 embraces the sleeve 35 in the same manner as in Figures 1 and 2. In the embodiment of Figure 6, therefore, the cup 71 can be readily removed from and placed on the sleeve without deforming the same.

From the descriptions it will be understood that this invention now provides a seal construction for relatively movable parts such as for pump shafts and associated housing parts wherein a rotating seal ring driven by the rotating part or shaft is maintained in sealed realtion with the rotating part of shaft through a flexible sleeve preferably composed of rubber. This flexible sleeve has a diaphragm portion or shoulder accommodating relative movement between the rotating seal ring and the rotating parts so that the parts can move in an axial direction or even tilt without disturbing the seal ring.

In a preferred embodiment of the invention the rubber sleeve has an inturned lip adapted to be seated in a peripheral groove of the rotating seal ring to prevent axial removal of the sleeve from the seal ring. In another embodiment of the invention a cup member is spun inwardly at its free end to clamp the sleeve onto the rotating seal ring.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a fluid seal the combination with a rotatable shaft and a stationary seal ring, of a rotatable seal ring surrounding said shaft, a flexible sealing sleeve having a reduced diameter collar portion embracing the shaft in sealing relation, an enlarged collar portion embracing the rotating seal ring in sealing relation, and a flexible diaphragm portion between said collar portions, a metal cup surrounding said collar portions of the sleeve and having a shoulder portion extending over the diaphragm portion of the sleeve, and a spring acting on said shoulder portion of the cup to urge the rotatable seal ring into sliding face engagement with the stationary seal ring.

2. In a pump construction including a casing, a bearing in said casing, a shaft rotatably mounted in said bearing, a cup member in said casing having an open end bottomed on said bearing and an apertured end receiving said shaft therethrough, said apertured end of the cup having an end face providing a stationary seal ring, and a rotating seal ring slidably keyed on said shaft having an end face for sliding face engagement with said end face of the cup, the improvements of a rubber sleeve having a reduced diameter collar portion at one end thereof snugly seated on said shaft, a larger diameter collar portion at the other end thereof snugly seated on said rotating seal ring and a flexible diaphragm portion connecting said collar portions, a retainer having a skirt portion seated on the larger diameter collar portion of the sleeve, a shoulder portion overlying the outer marginal portion only of said diaphragm portion of the sleeve and a collar portion on the inner end of said shoulder portion projecting away from the skirt portion, spring abutment means on said shaft, and a coil spring surrounding said shaft having one end thrusting against said abutment means and the other end seated on the collar portion of the retainer member acting against the shoulder portion of the retainer for urging the rotating seal ring against the stationary seal ring.

3. In a pump construction, a stationary seal ring, a shaft projecting through said stationary seal ring, a rotating seal ring slidable on said shaft, said rotating seal ring having a peripheral groove therearound, a rubber sleeve having a reduced diameter collar portion snugly seated on said shaft, a large diameter collar portion snugly seated on said rotating seal ring and having an inwardly projecting bead seated in said groove of the seal ring and a flexible diaphragm shoulder portion between said collar portions, a retainer having a skirt portion seated on said larger diameter collar portion of the sleeve and an inturned shoulder portion overlying the marginal portion only of said diaphragm portion of the sleeve, and spring means acting on said shoulder portion of the retainer to urge the rotating seal ring against the stationary seal ring.

4. A seal construction for a pump having a part providing a stationary seal ring and a rotating shaft projecting through the seal ring, a rotating seal ring slidably mounted on said shaft having a recessed end face remote from the sealing face thereof, and a rubber sleeve having elongated collar portions at opposite ends thereof respectively snugly engaging substantial portions of said shaft and said rotating seal ring and a flexible diaphragm portion connecting said collar portions overlying said recessed end face of the rotating seal ring and adapted to be flexed toward and away from the seal ring while maintaining the seal ring and shaft in sealed relation.

5. A pump construction having a housing defining a shaft well and a shaft projecting through said well, a stationary seal ring heated in said well receiving said shaft therethrough, a rotating seal ring receiving said shaft therethrough and having an end face coacting with said stationary seal ring, a rubber sleeve having elongated opposite end portions respectively snugly seated on substantial portions of the circumferential faces of said rotating seal ring and said shaft and a flexible diaphragm portion connecting said end portions adapted to be moved toward and away from the rotating seal ring, and a retainer snugly embracing the portion of the sleeve seated on the rotating seal ring.

6. In a pump construction having a casing providing a shaft well, a shaft projecting through said well and an impeller on said shaft having a slotted hub, a stationary seal ring in said well receiving said shaft therethrough, a rotating seal ring in said well receiving said shaft therethrough and coacting with said stationary seal ring, a rubber sleeve having a reduced diameter collar portion snugly seated on said shaft, a larger diameter collar portion surrounding said rotating seal ring and a flexible diaphragm portion connecting said collar portions, a metal cup member surrounding said larger diameter collar portion of the sleeve and having an inturned end clamping said collar portion to said rotating seal ring, said cup member having an inwardly offset shoulder providing a spring abutment surface and a reduced diameter side wall with inturned tangs seated in the slots of the impeller hub, and a spring held under compression between said impeller and said shoulder of the cup member for urging said rotating seal ring against the stationary seal ring, said flexible diaphragm portion of the sleeve accommodating relative axial movement between the rotating seal ring and the shaft while maintaining the seal ring and shaft in sealed relation.

7. In a pump construction a pump casing defining a shaft well and a stationary seal ring seated in said well receiving said shaft therethrough, the improvement of a rotating seal ring having an end face in sliding face engagement with said stationary seal ring and an opposed end face with an inwardly beveled portion adjacent said shaft, a rubber sleeve having a reduced diameter collar portion snugly seated on said shaft, a larger diameter collar portion snugly seated on said rotating seal ring, and a flexible diaphragm portion connecting said collar portions, a snap ring surrounding said reduced diameter collar portion and locking said collar portion on the shaft, and a cup member surrounding said larger diameter collar portion for holding said portion on the rotating seal ring, said diaphragm portion of the sleeve being movable toward and away from the beveled face of the rotating seal ring to permit relative axial movement of the rotating seal ring and shaft.

8. A shaft seal comprising a stationary seal member, a rotating seal member in sliding face engagement with the stationary seal member, a shaft extending freely through both members, a rubber sleeve having a reduced diameter portion snugly embracing said shaft, an enlarged cylindrical portion snugly embracing the outer face of said rotating seal member and a flexible shoulder portion connecting said embracing portions, and a cup member surrounding said sleeve having an inturned flange clamping the enlarged cylindrical portion of the sleeve on the rotating seal ring.

9. A shaft seal comprising a stationary seal ring; a sleeve having spaced elongated collar portions of different diameters and an intermediate diaphragm portion; a rotatable shaft passed through said sleeve in sealed engagement with the smaller collar portion thereof; means clamping said collar portion in sealed relation to said shaft; a rotatable seal ring slidable longitudinally on said shaft for engagement with said stationary seal ring and having peripheral sealed engagement with a substantial portion of the larger collar portion of the sleeve; a retainer cap embracing the larger collar portion on the rotatable seal ring to maintain said collar portion on said ring; a stop on said shaft exterior to said sleeve and spaced from the smaller collar portion; and a spring exterior to said sleeve to surround a portion thereof, said spring interposed between said stop and retainer cap for urging said rotatable seal ring longitudinally of said cap toward said stationary seal ring thereby to flex said diaphragm portion.

10. A shaft seal comprising a rotatable shaft, stationary and rotatable seal members arranged in face engagement with each other around said shaft, a flexible sealing sleeve having a reduced collar portion extending longitudinally of said shaft and anchored in sealed relation to said shaft for rotation therewith, said flexible sealing sleeve having an enlarged cylindrical portion also extending longitudinally of said shaft and embracing the outer face of said rotatable seal member, said cylindrical portion being yieldably connected to said collar portion to accommodate longitudinal movement of the rotatable seal member with respect to said shaft, a retainer cup engaged with said cylindrical portion to anchor said portion in sealed relation to the outer face of said rotatable seal member, and means yieldably urging said retainer cup longitudinally of said shaft to effect sliding face engagement between said stationary and rotatable seal members.

11. In a diaphragm type of shaft seal which includes a rotatable shaft and a seal ring rotatable therewith, the improvements of a rubber sealing sleeve comprising an enlarged cylindrical portion of substantial length embracing the cylindrical outer face of said seal ring and having a well-defined internal lip for engagement in an annular groove in said outer face of said seal ring, a reduced collar portion of substantial length embracing said shaft, and a diaphragm flexibly connecting said enlarged cylindrical portion and said collar, said collar portion having an external flange spaced from the juncture of said collar portion and said diaphragm to provide between the juncture and flange an annular seat for receiving a clamping ring to anchor said collar portion in sealing relation to said shaft.

RUSSELL R. CURTIS.